(No Model.) 2 Sheets—Sheet 2.
A. MILLER.
METHOD OF EVAPORATING IN CLOSED VESSELS.
No. 372,079. Patented Oct. 25, 1887.
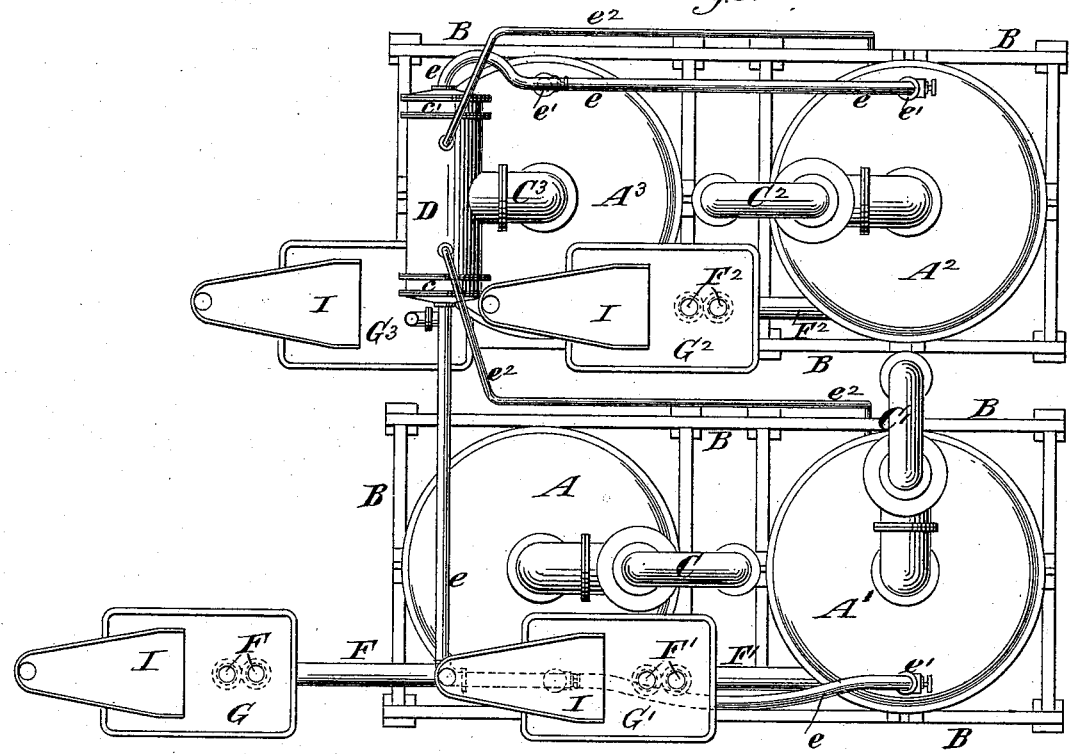
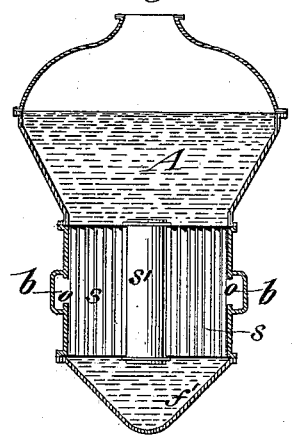
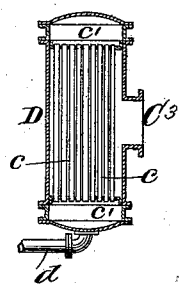
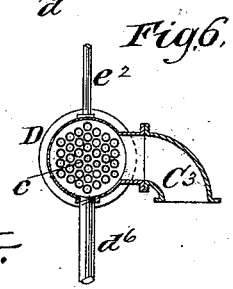
Witnesses.
Emil Herter.
C. Sundgren
Inventor:
Alexander Miller
by his Atty
Brown & Hall

UNITED STATES PATENT OFFICE.

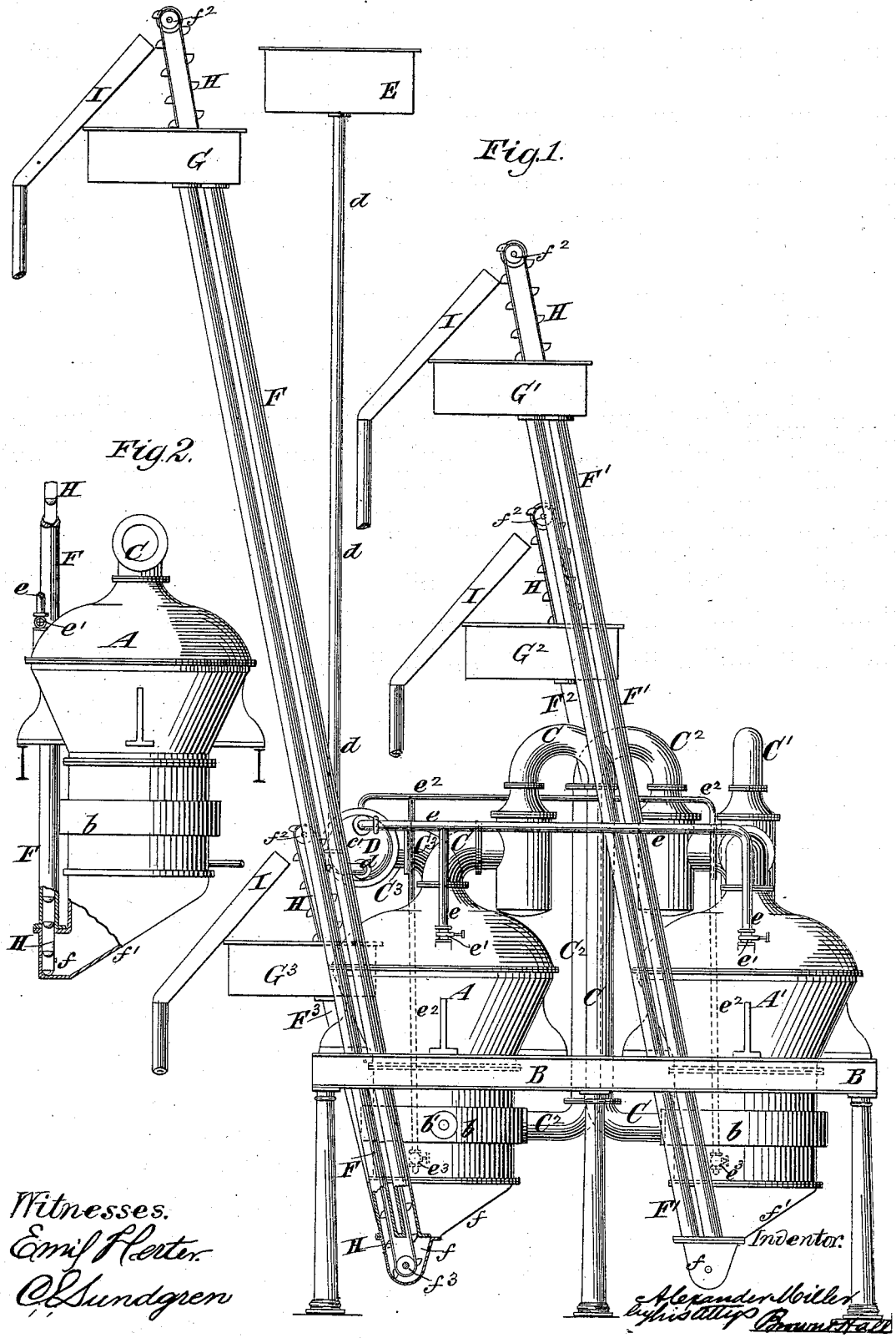

ALEXANDER MILLER, OF NEW YORK, N. Y.

METHOD OF EVAPORATING IN CLOSED VESSELS.

SPECIFICATION forming part of Letters Patent No. 372,079, dated October 25, 1887.

Application filed January 25, 1887. Serial No. 225,419. (No model.)

*To all whom it may concern:*

Be it known that I, ALEXANDER MILLER, of the city and county of New York, in the State of New York, have invented a new and useful Improvement in the Method of Evaporating in Closed Vessels, of which the following is a specification.

My invention relates to a method of evaporating which involves the employment of two or more evaporating pans or vessels arranged in series, the vapor-outlet from each pan being connected with the heating-drum of the pan next in the series, thereby providing for the heating of each pan, except the first, by the vapors evolved from the pan preceding it in the series. Where pans have been thus connected for operation it has been usual to employ a condenser and vacuum-pump, as in evaporating sugar; but in the evaporation of salt and other materials which are not injured by moderate heat it is not necessary to employ such condenser and vacuum-pump, and in carrying out my method the last pan in the series has its vapor-outlet communicating directly with the atmosphere. There is of course a loss of heat in the series of pans, due to the radiation from the pans and due to the heat contained in the solid precipitant removed from the pans; and hence it follows that where pans are connected for multiple effect, and where the vapor-outlet of the last pan is open to the atmosphere, the heat in the first pan must be very much above 212° in order to produce ebullition in the last pan of the series.

My invention consists in an improvement in the method of evaporating by maintaining a series of separate and distinct bodies of liquor, and heating each body after the first by vapor emanating from the next preceding body in the series, consisting in maintaining the atmospheric pressure on the last body of the series and in supplying for heating the first body of liquor steam of a temperature sufficient to produce boiling in the last body of liquor under atmospheric pressure.

In the accompanying drawings, Figure 1 is an elevation of a multiple-effect evaporating apparatus for carrying out my invention, and comprising four pans or vessels. Fig. 2 is a side elevation, partly in section, of one of the pans in a plane at right angles to Fig. 1, showing a pit or pocket at the bottom thereof, from which precipitant is removed, and an inclined bottom whereby the precipitant is caused to gravitate toward said pit. Fig. 3 is a plan of the apparatus. Fig. 4 is a horizontal section of a heater which may be employed for raising the temperature of the brine or other liquor by means of the vapor escaping from the last pan of the series and before its introduction to the several pans. Fig. 5 is a vertical section of one of the pans in a plane at right angles to the plane of Fig. 2, showing its internal construction and the approximate level of brine or other liquor maintained therein; and Fig. 6 is a transverse vertical section of the heater.

Similar letters of reference designate corresponding parts in all the figures.

For carrying out my invention I have shown an apparatus like that which forms the subject of my application, Serial No. 200,393, filed April 28, 1886.

A A' A² A³ designate four closed evaporating-pans, which may be supported by a suitable frame-work, B, and which are connected in series for multiple effect. The lower portion of each pan is constructed in any of the well-known ways for applying the heating-vapor to heat the contents of the pans. For example, the lower portion of each pan may comprise a section which contains vertical heating-tubes $s$, as shown in Fig. 5, through which the liquid in the pan has free circulation upward, and a central throat or passage, $s'$, through which the downward circulation may take place, and the steam or heating vapor circulates freely around the tubes and throat $s$ $s'$. Each of the pans may be constructed at its lower portion with a surrounding belt or jacket, $b$, into which the heating-vapor enters, and the jacket $b$ of the first pan, A, may have an inlet-nozzle, $b'$, as shown in Fig. 1, for the introduction of steam. The jacket or belt $b$ is simply for the purpose of conducting the steam or vapor all around the heating-section of the pan, so that it may be evenly distributed among the tubes $s$, several openings, $o$, from the belt to the interior of the heating drum or section being provided for the free entrance of the steam, as shown in Fig. 5. The steam or vapor from the belt $b$ does not enter the pan proper at all, but simply comes in contact with the exterior of the tubes $s$, through which the liquid in the pans circulates. This construction of the pans, as shown in Fig. 5, is a usual one, and in itself constitutes no part of my invention.

From the first pan, A, the vapor driven off passes by a pipe or conduit, C, to the lower portion of the second pan, A', and serves to heat the contents thereof. From the second pan, A', the vapor passes by a pipe or conduit, C', to the lower portion of the third pan, $A^2$, and serves to heat the contents of said third pan. From the top of the third pan, $A^2$, the heating-vapor passes by a pipe or conduit, $C^2$, to the lower portion of the fourth pan, $A^3$, and from the fourth pan the vapor, of comparatively low temperature, is conducted away through a pipe or conduit, $C^3$, to a heater, D. (Shown in Fig. 3 and also in Fig. 1.) The position in which this heater D is placed is not material to the invention. It may be placed in any position—as, for instance, the ground-floor on which the apparatus stands, or on an extension-platform which is supported by the framework B. This heater may be of any well-known construction—such as is common in surface condensers—and is represented in Figs. 4 and 6. The heater there shown has a shell or body containing series of tubes $c$, and having at opposite ends distributing chambers or heads $c'$. The liquor to be evaporated is taken from an elevated tank, E, (shown in Fig. 1,) or is supplied by a pump, in either case passing through a pipe, $d$, to the distributing-chamber or hollow head $c'$ at one end of the heater D. The vapor escaping from the pan $A^3$ through the pipe or conduit $C^3$ by circulating around the tubes $c$ imparts its heat to the liquor which circulates through said tubes and between the distributing-chambers or hollow heads $c'$ of the heater. From these distributing-chambers or hollow heads $c'$ the heated liquor may pass from the heater through the pipes $e$, which are provided with valves $e'$, to the several pans of the apparatus, and admitted to them severally, as may be required, to maintain the quantity of liquor in them, or continuously, if desired.

I have shown the pipes $e$ as leading from both distributing-chambers or hollow heads $c'$ of the heater; but they might extend only from the chamber or hollow head at the opposite end of the heater from that with which the supply-pipe $d$ communicates. Inasmuch, however, as the supply-pipe $d$ communicates with the lower portion of the heater and the pipes $e$ with the upper portion of the heater, as shown in Fig. 1, there will always be a sufficient circulation through the tubes $c$ to insure the heating of the liquor before it passes through the pipe $e$, which is connected with the same end of the heater as the supply-pipe $d$. Not only does the heater receive, as a heating agent, the vapor from the last pan, $A^3$, but it may also receive the hot water of condensation from the lower heating section or drum of each of the pans, and this water may be delivered to the heater from the lower portion of the heating-drums through pipes $e^2$, provided with valves $e^3$. The pressure of the heating steam or vapor in the several heating-drums is sufficient to raise the water of condensation through the pipes $e^2$ to the heater D; but the valves $e^3$ are so regulated that the pressure of vapor in the heating-belts will force the water of condensation past them into the heater D without allowing any material quantity of the heating-vapor to escape through the pipes $e^2$.

All water of condensation escapes from the body of the heater D through an outlet-pipe, $d'$, (shown in Fig. 6,) and may be allowed to run to waste or employed for feeding boilers or other purposes.

So far as described the apparatus does not necessarily include my invention; but I will now proceed to describe particularly wherein the invention consists.

As before stated, the pressure and consequent temperature in the several pans should decrease gradually from the first pan throughout the series to the last pan, $A^3$, and I automatically control the pressure and consequent temperature within the several pans by means of hollow columns F F' $F^2$ $F^3$, which extend upward to unequal heights above the several pans, and the lower ends of which communicate with the liquid in the pans, while their upper ends are connected with open pans or pockets G G' $G^2$ $G^3$, which are exposed to the atmosphere. Consequently it will be seen that the pressure in each of the pans will be controlled by the height of liquid column in the hollow columns F F', &c., and that this pressure will control the temperature at which the contents of each pan will boil and give off vapor. As shown in Fig. 1, the hollow column F from the first pan, A, is the highest, and consequently the greatest pressure and temperature will be maintained in the first pan, A, and the height of the several columns is decreased step by step throughout the series of pans, the column $F^3$ springing from the last pan of the series, $A^3$, having a height not materially above the level of the liquor in the pan. Consequently the liquor in the last pan will boil at about atmospheric pressure.

The operation of the apparatus will be as follows: All the pans A A' $A^2$ $A^3$ are filled with brine or other liquid up to about the level indicated in Fig. 5, and steam is turned on to the heating-belt of the pan A, whereby contact with the tubes $s$ it imparts its heat to the liquid in the pan A. Ebullition immediately takes place in the pan A, and the vapors pass off through the pipe C into the heating-belt $b$ of the pan A', and are by contact with the tubes in the pan A' condensed, thereby imparting their heat to the liquid in the pan A'. The vapors from the pan A' pass over through the pipe C' into the heating-belt $b$ of the pan $A^2$, and the vapors from the pan $A^2$ pass over through the pipe $C^2$ into the heating-belt of the pan $A^3$, and the vapors from this latter pan pass over into the heater D. By the time the liquid in the pan $A^3$ has attained a temperature of 212°, or slightly above it, the liquid in the pan A² will be boiling at a higher temperature, as its vapor has to supply heat enough to produce vapor in the pan A³, and to also supply heat carried off by the discharge of precipitant, as well as that dissipated by radiation from the pan A³ and from the upper part of the pan A²; but the increasing temperature in the pan is accompanied by an increased pressure, which causes a small portion of the liquid in the pan A² to rise in the hollow column F² to a height due to the pressure maintained in the pan A², and to which height the hollow columns are made to conform. The height of liquid in the hollow column is not the object sought, but is simply the result of maintaining a certain temperature in the pan and providing a ready means of discharging the precipitant. The same differences are produced between the pans A² and A', but to a greater degree, and so on to the pan A, where the highest temperature is maintained, due to the temperature of steam admitted into the heating drum or section of the pan A. Thus it will be seen that a certain quantity of heat has been put into the pan A, and has resulted in producing vapor or steam from the contents of said pan to heat the contents of the pan A'; and by the time this heat passes through all the pans and reaches the heater D it is all dissipated, except the comparatively small quantity passing off through the heater D from the pipe $d'$ in the condition of water of condensation; and it follows that a reduction in temperature of the heat in the several pans results in a consequent reduction of pressure from one pan to the other.

The number of pans and the height of columns should be such that the vapor from the last pan will only be sufficient to raise the temperature of the brine or liquor in the heater D to nearly the boiling-point. Under these conditions all the vapor from the last pan will be condensed in the heater by the cold brine or liquor, thereby preventing any discharge of vapor from the apparatus, which would involve a waste of heat. There is consequently no waste of heat in the apparatus, except that which is due to radiation and that which is in the hot deposit as it is removed, and this, from the nature of things, cannot be entirely prevented, but is reduced to the minimum by the use of non-conducting covering for the pans, pipes, &c. The water of condensation in the vapors from the heating-drums of the several pans, being necessarily at the temperature due to their respective pressures, is also discharged into the heater with the vapor from the last pan and there parts with its surplus heat to the brine or liquor; hence all the water separated by evaporation from the resultant solid materials finally is discharged from the heater and at a comparatively low temperature, considerably below the boiling-point. This is the measure of the economy of the apparatus, there being no discharge of heat except by this water of condensation and by the solid materials, there being no discharge of vapor, which is a great conveyer of heat. The specific heat of the solid materials of the solution being very small compared with the heat required to effect evaporation of the water, and as the only heat carried off in the apparatus is that required to heat the solid materials of the solution, plus a small percentage due to radiation, the smaller the percentage of this solid matter the greater will be the number of pans required to precipitate enough solid material to absorb all the heat entering the first pan, it being readily understood that in the first pan the heat carried off by the solid materials is small compared with the heat passing on into the second pan with the vapors. The same thing exactly takes place in the second pan, and so on through each of them, until the vapors arising from the last pan are just sufficient to heat the liquid which is being fed to the apparatus up to near its boiling-point.

The several columns afford a convenient avenue for the discharge of precipitant from each pan. As best seen in Fig. 1, I have represented an elevating apparatus, H, as arranged in each hollow column; and in order to accommodate the ascending and descending portions of this elevator-belt, I have represented each column F F', &c., as composed of two tubes extending parallel with each other from an elevator pit or pocket, $f$, at the bottom of each pan upward to a corresponding pan or open vessel, G G', &c. As best shown in Fig. 2, the elevator pit or pocket $f$ of each pan is at the side of its lower portion and projects beyond the side of the pan, and the bottom $f'$ inclines toward this elevator pit or pocket $f$, so as to deliver thereinto, by gravity, the salt or other solid precipitant. The elevator bands or belts pass around upper and lower drums or pulleys, $f^2 f^3$, in the usual way, and may each be driven by a belt running on a pulley concentric with the drum $f^2$ or $f^3$ at the top or bottom of the elevator. Each elevating apparatus H may deliver the solid material into or through a spout or ductor, I, as shown in Fig. 1.

What I claim as my invention, and desire to secure by Letters Patent, is—

In the method of evaporating by maintaining a series of distinct and separate bodies of liquor and heating each body after the first by vapor emanating from the next preceding body in the series, the improvement consisting in maintaining atmospheric pressure on the last body of liquor in the series, and in supplying, for heating the first body of liquor, steam of a temperature sufficient to produce the boiling of the last body of liquor under atmospheric pressure, substantially as herein set forth.

ALEX. MILLER.

Witnesses:
C. HALL,
FREDK. HAYNES.